June 22, 1937.　　　　J. J. BAUMAN　　　　2,084,424
REFRIGERATING APPARATUS
Filed Nov. 6, 1935　　　　5 Sheets-Sheet 3
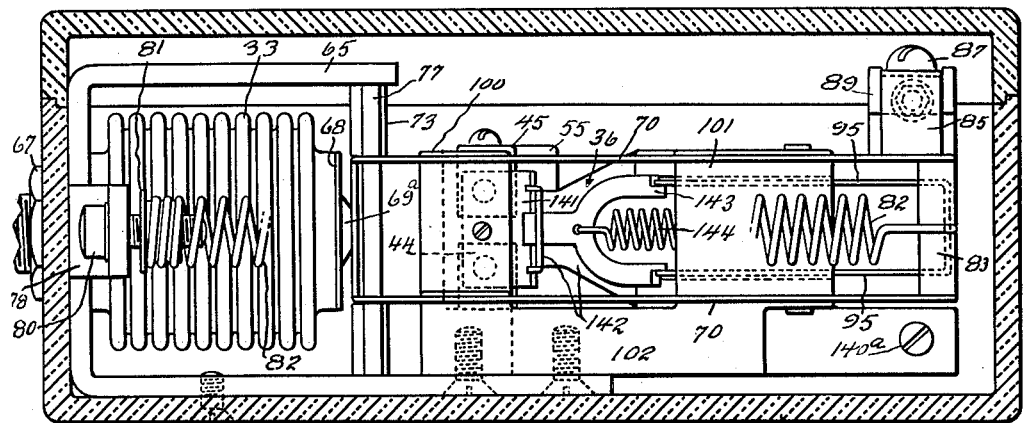
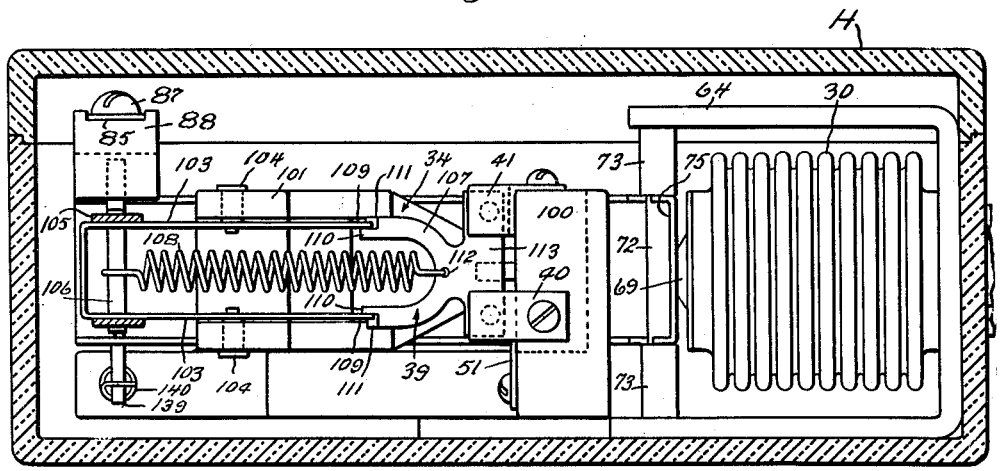
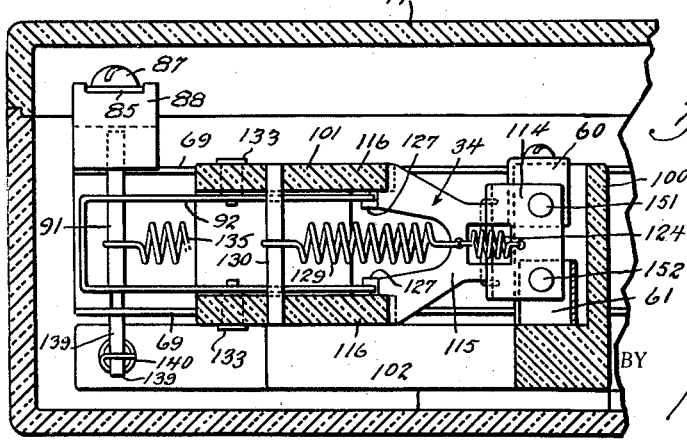
INVENTOR.
J. J. Bauman
BY Hull Brock & West
ATTORNEY.

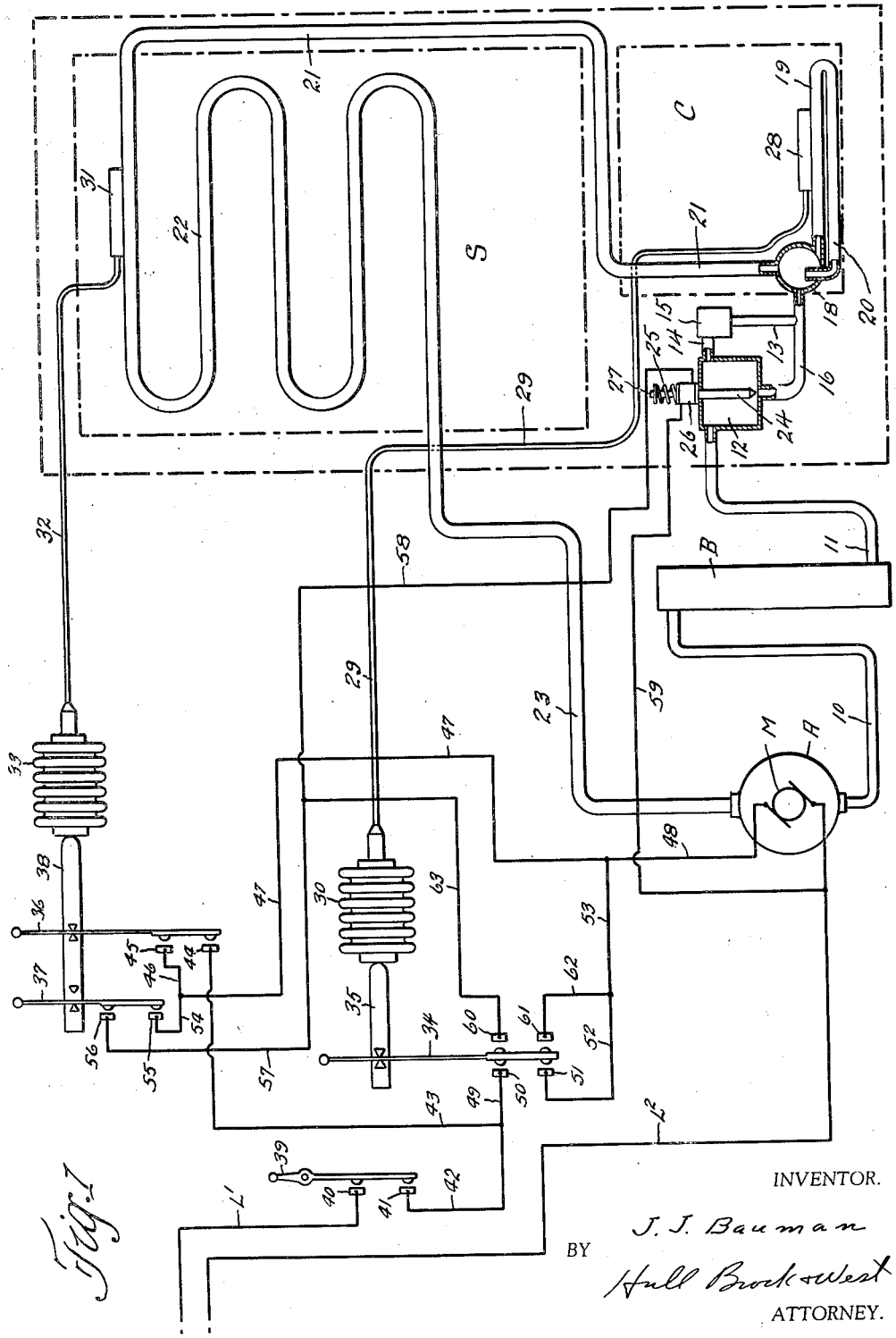

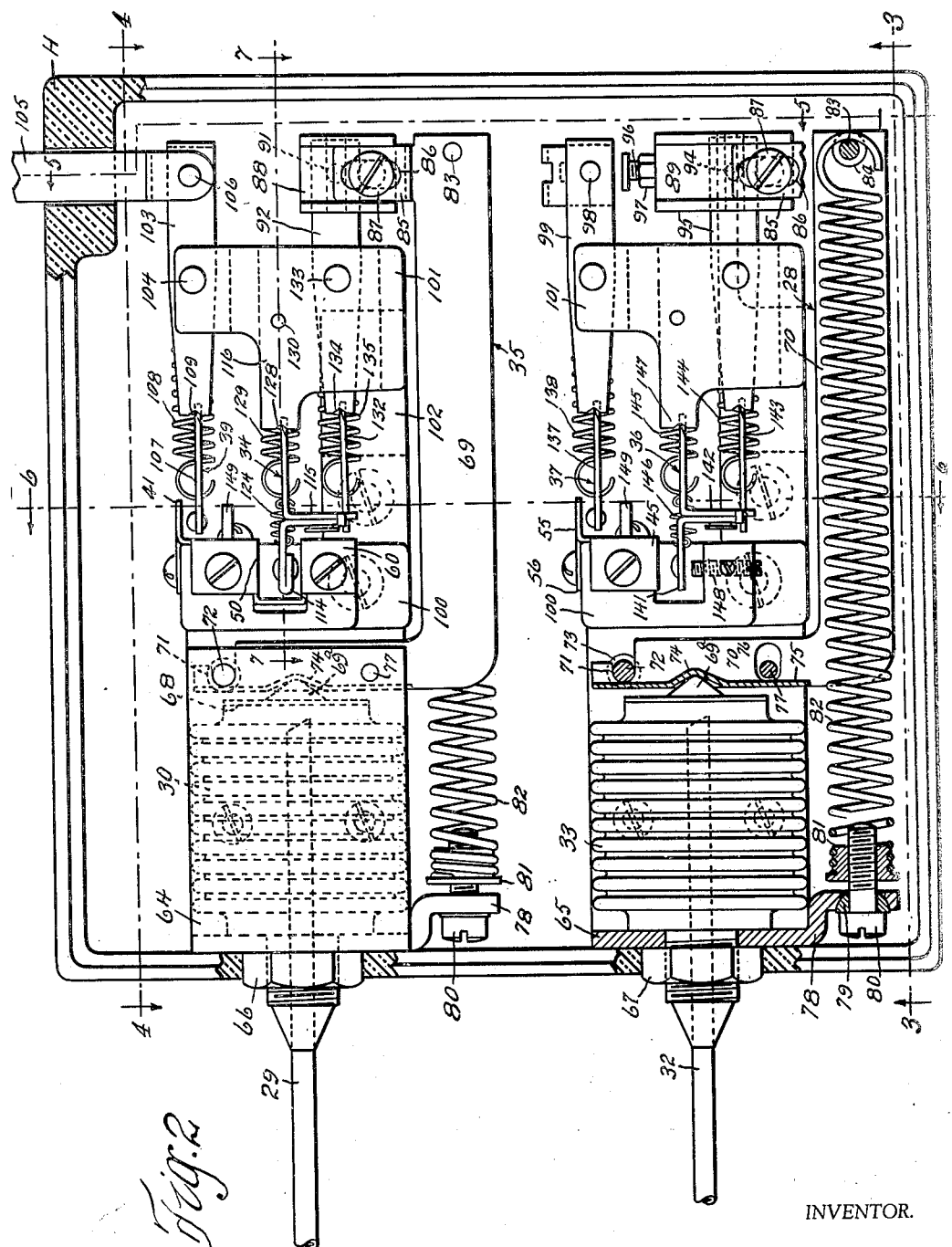

INVENTOR.
J. J. Bauman
ATTORNEY.

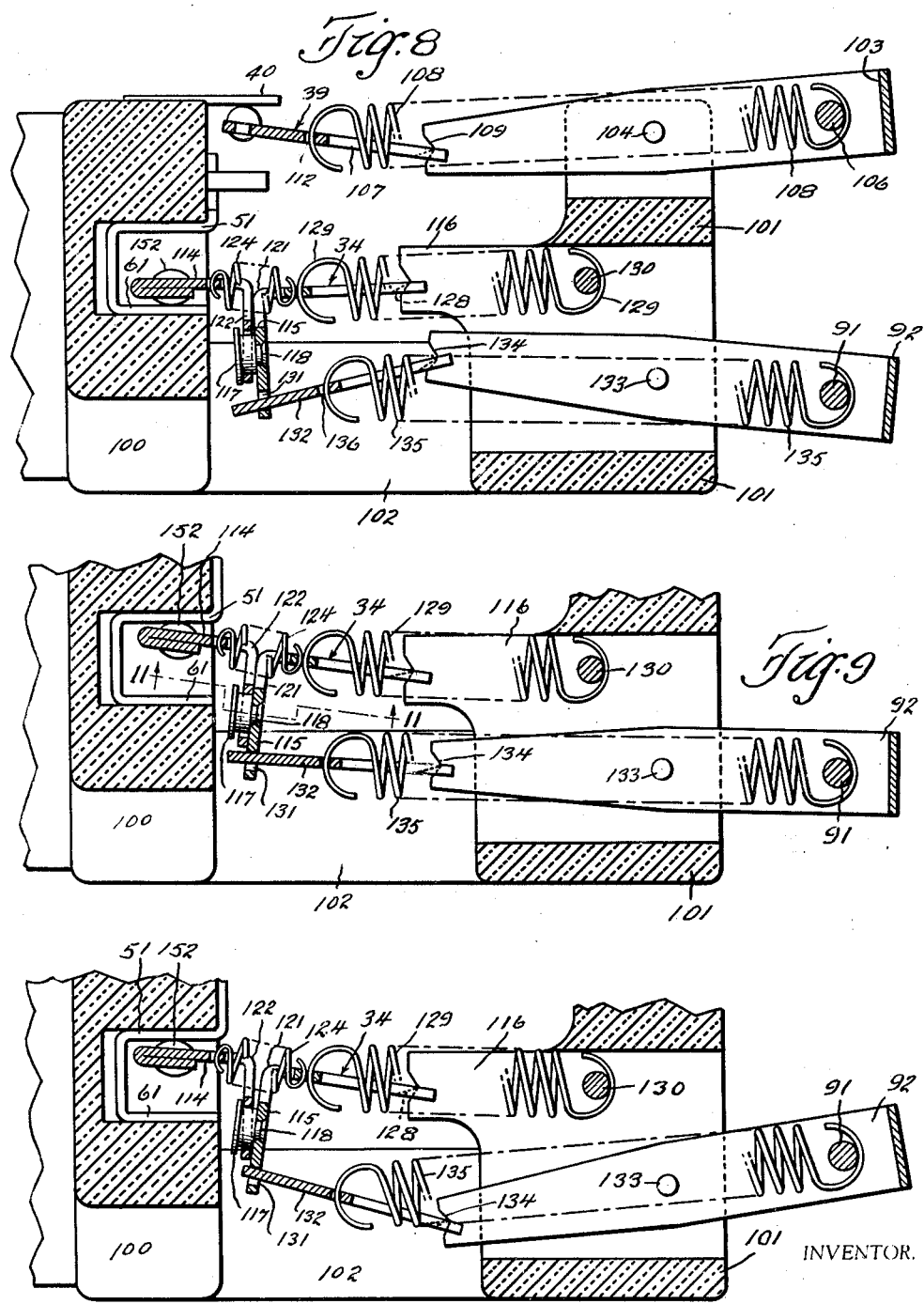

Patented June 22, 1937

2,084,424

UNITED STATES PATENT OFFICE 2,084,424

REFRIGERATING APPARATUS

John J. Bauman, Lima, Ohio

Application November 6, 1935, Serial No. 48,548

14 Claims. (Cl. 200—83)

This invention relates to a refrigerating system wherein separate controls are provided for storage and freezing spaces or compartments and has for its principal object to provide an effective mechanism for controlling the temperature of these compartments, operating to provide cooling in the storage compartment when the temperature therein is above a desired maximum temperature, such, for example, as the temperature above which it is unsafe to maintain food in storage, and, when the temperature in the storage space is below such predetermined maximum, to preferentially cool the freezing space or compartment at the expense of the storage compartment until an optimum temperature has been reached in the freezing space or compartment, and, then, again operating to provide cooling for the storage compartments, lowering its temperature from a predetermined maximum to a predetermined optimum.

A further object is to render the attainment of the said principal object practical by the provision of control mechanism peculiarly adapted for its purposes and which may comprise an element which is movable responsive to temperature changes in the said compartments or to physical or other changes, which are functions of temperature changes, and the provision of switch mechanisms interrelated with such thermally responsive movable mechanism to provide for the operation of one of such switch mechansims to open and close the same by a small back and forth motion in one limited region of the motion of said thermally responsive movable element and to operate another of said switch mechanisms to open and close the same by a small back and forth motion of said thermally responsive movable element in another limited region of its motion.

A still further object is the provision of switch mechanism which can be operated by very small motions of an operating element so that the last mentioned object becomes practical and at the same time to provide for a switch which shall have at no time a zero contact pressure, one which will provide for a wiping action of one contact with respect to another at the times of making and breaking contact, to provide for a hammer break, and other functions which will appear hereinafter.

Figure 5:
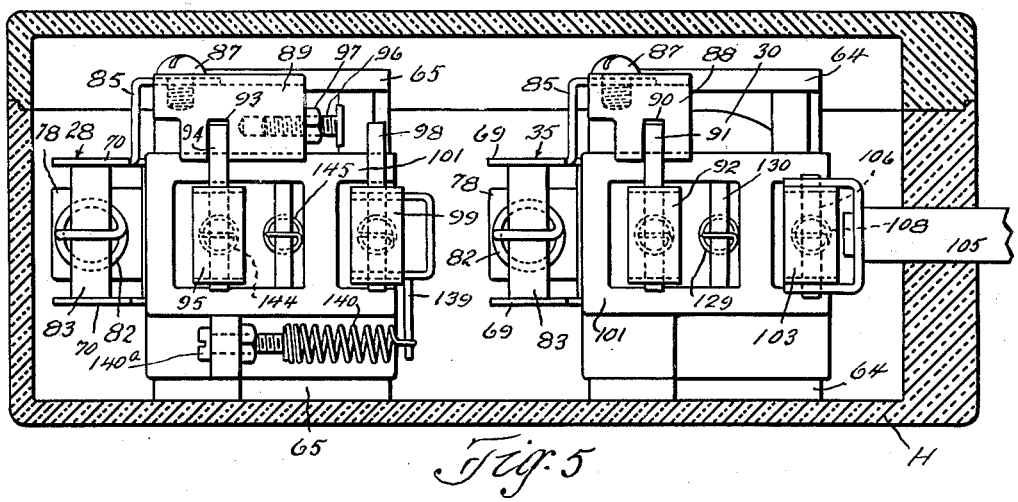
Figure 6:
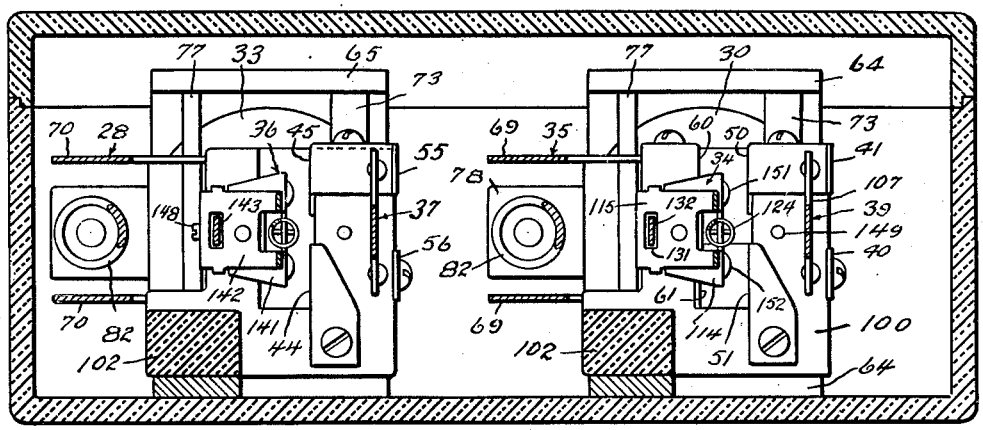
Figure 11:
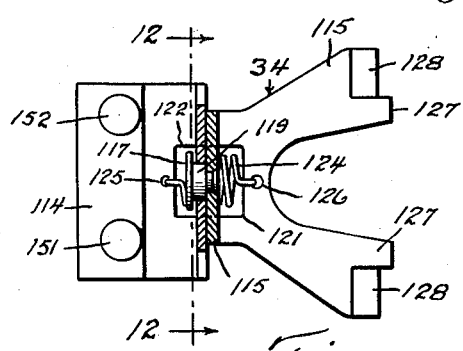
Figure 12:
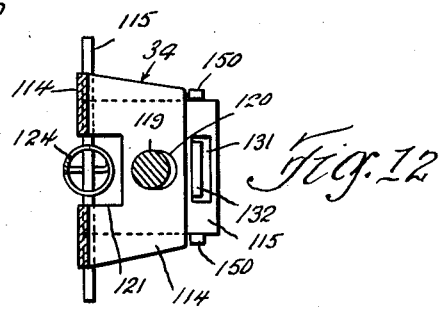

With the foregoing and other objects in view, the invention consists in the novel features of construction and arrangements of parts, all working toward a common end, as will be apparent from the following description especially when read in connection with the accompanying drawings in which Fig. 1 is a schematic showing indicating one arrangement of compartments, construction of refrigerant circulating mechanism and relations thereto of thermally responsive elements and electric circuits. (It is to be understood that the construction of such portions of the system as are indicated in Fig. 1 and not elsewhere indicated in detail will be sufficiently understood from the diagrammatic showing by any person skilled in the art to enable such person to construct and operate the device. Such portions of the structure illustrated in Fig. 1 as require further elaboration to enable a person skilled in the art to practice the invention are illustrated in detail in Figs. 2 to 12, inclusive); Fig. 2 is a sectional view taken through a control box in which are housed the thermally expansible elements responsive to temperatures in the storage and freezing compartments together with the levers and switches operated thereby as well as a manual switch for starting and stopping the operation of the device; Figs. 3, 4, 5, 6 and 7 are sections on the lines 3—3, 4—4, 5—5, 6—6 and 7—7, respectively, of Fig. 2; Fig. 8 is a detailed fragmentary sectional view taken horizontally through the switch mechanism of the upper unit as seen in Fig. 2 while Figs. 9 and 10 are fragmentary views similar to the lower portion of Fig. 8 and when taken with Fig. 8 showing three positions of the mechanism making up one of the switches; Fig. 11 is a fragmentary sectional view corresponding substantially to a section on the line 11—11 of Fig. 9 and Fig. 12 is a detailed section on the line 12—12 of Fig. 11.

The general construction and operation of a refrigeration system embodying my invention will now be described with reference to Fig. 1 after which the construction of the switch mechanism and operating means therefor will be described with reference to Figs. 2 to 12 inclusive. Then the operation of the switch mechanisms will be described in detail having reference to Figs. 8, 9, and 10. Similar reference characters indicate similar parts throughout the drawings.

*General construction and operation*

This invention is herein shown and described as being embodied in a refrigerator which is provided with two compartments, insulated from each other, one of which is to be operated at a low temperature for the purpose of freezing ice (or other substances) while the other is to be operated at a relatively higher temperature, although below room temperature for the purpose of preserving food stored therein. In the drawings, the ice freezing compartment is indicated by the reference character C while the food storage compartment is indicated by the reference character S, the walls being indicated in dotted outline and it being understood that the spaces between the dotted outline are filled with suitable insulating material.

Cooling is accomplished by circulating a refrigerant through suitable passages, the same taking the form of a substance which may be forced by compressor A through a pipe 10 into a condenser B where it is condensed to liquid form and delivered through a pipe 11 into a magnetic valve chamber 12 which forms a reservoir of the liquid refrigerant. From the reservoir 12 the refrigerant flows through the pipe 14 to a chamber 15 containing a float valve and thence through the pipe 13 to the bulb or header 18. The float valve opens when there is sufficient liquid in the chamber 15 to raise the float. From the header 18 the liquid may enter and evaporate in the coil 19. The coil 19 preferably has all its convolutions in the same horizontal plane and may pass back and forth a plurality of times before it reenters the bulb or header 18, but is for convenience shown as comprising one convolution having its parts vertically aligned. From header 18, the refrigerant may pass upwardly through a pipe 21 to the food storage compartment cooling coil 22 and return through pipe 23 to the compressor A. The requirements and capacity of the system will be such that liquid refrigerant supplied through the float valve 15 will not raise the level above a predetermined height, too low to have the full refrigerating effect on the storage compartment. However, an additional valve 24, normally closed by a spring 25 and opened by an electromagnetic coil 26 operating upon a plunger 27, is provided for discharging the contents of the chamber 12 through pipe 16 to the header 18, also bypassing the float valve whereby to supply a greater quantity of liquid refrigerant. Upon the opening of the valve 24, liquid refrigerant will rise higher in the system and enhance the rate of cooling by the coil 22.

It will thus be seen that when the magnetic valve 24 is closed, the freezing compartment will be preferred over the storage compartment and that when the magnetic valve 24 is open, both the storage compartment and the freezing compartment cooling elements receive liquid refrigerant.

Mounted on the cooling element 19 or at any suitable point in the compartment C, is a bulb 28 forming a part of a temperature responsive element of the type which contains an expansible fluid, preferably a saturated vapor, in order to increase the amount of expansion for a given change in temperature. The interior of the bulb 28 is connected in communication, through a tube 29, with an expansible bellows 30. A similar bulb 31, mounted on the cooling element 22 or at any suitable point within the compartment S, communicates through a tube 32 with the interior of a similar expansible bellows 33. The bellows 30 actuates a movable switch element 34 through the medium of an actuator 35 while the bellows 33 actuates movable switch elements 36 and 37 through an actuator 38. The actuator 38 and the movable switch elements 36 and 37 are so constructed that when the temperature is above a predetermined maximum, the switch element 37 will be moved to make contact while the switch element 36 may be opened and closed at a considerably lower temperature. In the present construction, the point at which the switch element 37 makes contact will represent the predetermined maximum permissible temperature in the storage compartment S, while the switch element 36 will be opened and closed within a narrow temperature range corresponding to the desired optimum temperature in the compartment S.

It will be understood that the switch mechanism illustrated in Fig. 1 is schematic and that the actual construction thereof is shown in accordance with the present preferred embodiment in other views of the drawings.

Assuming that both the storage compartment and the freezing compartment are at room temperature and it is desired to start the device, the manual switch 39 is closed. The temperature conditions will be such that the switch elements 34, 36, and 37 will be toward the left against the contacts. Motor circuit will be completed from L' through switch contacts 40 and 41 and conductors 42 and 43, through switch contacts 44 and 45 and conductors 46, 47 and 48 to the motor M and back to L²; a parallel motor circuit will exist from L' to switch contacts 40 and 41, conductor 49, switch contacts 50 and 51, conductors 52, 53 and 48 to the motor and then to L². It will thus be seen that a motor circuit is established by motion of switch element 36 to the left and an independent motor circuit is established by motion of switch element 34 to the left. At the same time a circuit for the magnetic valve 24 is made from L' through switch points 40 and 41, conductors 42 and 43, switch points 44 and 45, conductors 46 and 54, switch points 55 and 56, conductors 57 and 58 to the winding 26 which controls the magnetic valve 24 and thence through conductor 59 to L².

Responsive to this condition, the motor M will drive the compressor A and, since the magnetic valve will be open the header 18 will be filled with liquid refrigerant which will rise in the pipe 21 and pass to the cooling element 22 for the compartment S whereby both compartments are supplied with refrigerant until the temperature of compartment S shall have been reduced sufficiently to permit the expansible element 33 to contract and the actuator 38 moved to the right far enough to break the circuit through the switch points 55 and 56. As soon as this circuit has been broken the spring 25 will cause the magnetic valve 24 to close whereupon the liquid refrigerant will cease to rise in pipe 21 to coil 22 and the freezing compartment will be preferred over the storage compartment. This condition will then prevail (unless the temperature in compartment S rises above a safe maximum) until such time as the compartment C has been reduced to a predetermined optimum temperature after which the bellows 30 will cause the actuator 35 to move the switch element 34 toward the right so as to break the circuit through the switch points 50 and 51 and to make a circuit through switch points 60 and 61. The motor circuit through the switch points 50 and 51, described above, will now be broken but the motor circuit through switch points 44 and 45 will still be complete so that the compressor will run. At the same time the magnetic valve will be opened by means of a circuit established from L' through switch points 40 and 41, conductors 42 and 43, switch points 44 and 45, conductors 46, 47, 53 and 62, through switch points 61 and 60 and through conductors 63 and 58 to the coil 26 thence through conductor 59 to L². The magnetic valve being open the refrigerant will rise in pipe 21 to coil 22 and this condition will prevail until the temperature in the compartment S has been reduced to a predetermined optimum after which the element 33 will operate to move the switch element 36 to the right whereby to break the compressor motor circuit and stop the compressor unless the freezing compartment should demand refrigeration, which would cause movable element 30 to move actuator 35 to the left opening contacts 60 and 61 and closing contacts 50 and 51.

It will thus be seen that when the storage compartment is above a maximum for safe preservation of food, liquid refrigerant will be supplied to coil 22 through the magnetic valve until its temperature shall have been reduced below such maximum after which the ice freezing compartment will be preferred until its temperature has been reduced to the optimum. The food storage compartment will then receive refrigerant again until its temperature has been reduced to the optimum. When both compartments are at the predetermined optimum the compressor is stopped and the magnetic valve 24 is closed.

*Construction of switch operating means and switches*

In Fig. 2 I have shown two units the upper of which is responsive to the temperature in the freezing compartment C and the lower of which is responsive to the temperature in the storage compartment S. Each of these units includes a pair of switches and expansible bulbs and levers actuated thereby for operating switch mechanisms. The bulbs and arms are of substantially identical construction for which reason the upper has been shown in elevation and the lower in section so that by reference to this view the appearance of these mechanisms in elevation and in section will be readily apparent. The tubes 29 and 32, connected with bulbs 28 and 31 respectively are connected in operative communication with bellows 30 and 33. The bellows 30 and 33 are mounted within U-shaped elements 64 and 65, respectively, passing through suitable openings in the bight portions of said U-shaped members as best seen in the lower portion of Fig. 2 and held in fixed relation thereto by suitable nuts 66 and 67. Each of said bellows is provided with a suitable hardened contact plate 68 carrying a projection 69ª adapted to transmit expansion of the bellows to operating arms 69 and 70. The operating arms 69 and 70 are pivotally mounted with respect to the U-shaped elements 64 and 65 by open bearings 71 receiving pivot rods 72 which are mounted in the U-shaped members 64 and 65. The levers 69 and 70 are of a width less than that of the U-shaped members, for which reason, spacing sleeves 73 are inserted between the edges of such arms and the adjacent inner surfaces of the U-shaped members. Each of the arms 69 and 70 is provided with a depressed portion 74 adapted to receive the projections 69ª. The arms 69 and 70, in the region of the bellows is of channel cross section but the web forming the channel terminates at about the lower edge of the U-shaped member as is clear from the lower portion of Fig. 2. In the flanges which form with the webs 75 the channels just referred to, are formed openings 76 through which pass pins 77 adapted to engage the webs 75 to limit the motion of the arms 69 and 70 in one direction, the other ends of the openings 76 serving to limit motion of said arms in the other direction. Extending from the U-shaped elements 64 and 65 are projections 78 within which are formed openings having part spherical surfaces receiving part spherical washers 79 through which pass studs 80 which are threadedly received for purposes of adjustment within spring anchoring elements 81 serving to anchor the left hand ends of the spring 82. The right hand ends of the angular levers 69 and 70 are provided with posts 83 receiving the upper ends of the springs 82 within centrally located grooves 84 thereof. The posts 83 serve as connectors for the upper ends of the arms 69 and 70 whereby to impart rigidity to these levers. Projecting from the upper branch of each of the levers 69 and 70 as seen in Fig. 2 are projections 85 (see Figs. 2 and 5) each of which is provided with a slot 86 adapted to receive studs 87 for securing to such projections blocks 88 and 89 of insulating material. The block 88 is provided in its lower surface with a groove 90 adapted to receive a rod 91 for actuating an element 92. The block 89 has a similar groove 93 adapted to receive a rod 94 for actuating an element 95. The block 89 also receives adjustably a stud 96 which may be threaded therein and held in any desired position of adjustment by a lock nut 97. The element 96 is provided with a flattened head adapted to engage a rod 98 for operating an element 99.

The switch mechanisms operated by the mechanism just described are mounted on suitable frameworks of insulating material preferably having all parts integral and which may be described generally as consisting of contact mounting sections 100 and actuator mounting sections 101 connected by narrower connecting elements 102. These frameworks are of such shape that they can best be understood by reference to the drawings rather than to detailed description. The shape of these frameworks will be obvious from Figs. 2, 3, and 4, the parts being located by the numerals 100, 101 and 102.

The manual switch indicated on Fig. 1 by the numerals 39, 40, and 41 comprises a pivotally mounted element 103, pivoted to the portion 101 of the insulating framework as indicated at 104, a push button 105 extending to the outside of the housing H through a suitable opening therethrough and pivoted at 106 to the element 103, as well as a movable contact arm 107 pivoted upon the end of the element 103 and connected thereto by a spring 108. As will be seen by reference to Fig. 4 the element 103 is U-shaped and terminates in a notched end 109. The element 107 has a U-shaped end and terminates in a stepped construction presenting stop elements 110 extending within the U-shaped element 103 and knife edged elements 111 engaging within the notches at the point 109 whereby to form a knife edged pivot point and at the same time to prevent displacement of the element 107 with respect to the element 103. The spring 108 is connected to the pin 106 by being hooked thereover and if desired being received in a groove while being connected at the other end to the element 107 by passing through a small opening 112 located centrally of the bight portion of the U-shaped part of the element 107. The element 107 also includes a bridging portion 113 adapted to form an electrical bridge between contact elements 40 and 41 whereby to complete the circuit as indicated in Fig. 1.

The switch mechanism, the movable part of which is indicated generally by the numeral 34 and which is responsive to expansion and contraction of the bellows 30 through the operating arm indicated generally by the numeral 35 (see Figs. 1 and 2), and specifically by the numeral 69, may be considered as being made up of fixed contacts 50, 51, and 60, 61, a composite movable contact and an actuator therefor. The arrangement of the fixed contacts is best seen at the right hand side of Fig. 6 where contact 60 will be found at the upper left with contacts 50 and 41 at the upper right, the two latter being parts of a single piece of sheet metal instead of two separate parts connected by conductors 42 and 49 as shown in Fig. 1. Contacts 61 and 51 are a single piece of sheet metal instead of two separate contacts connected by conductors 52 and 62 as shown in Fig. 1. These contact elements are composed of sheet metal and secured to the portion 100 of the insulating framework by suitable screws which also function as binding posts.

The composite movable contact element, best seen in Figs. 8, 9 and 10 includes a pair of angle members 114 and 115 connected together by a lost motion connection and mounted on a projection 116 of the portion 101 of the insulating framework. The lost motion connection between the angle members 114 and 115 consists of a headed element 117 secured as by a rivet projection 118 firmly to the element 115 and having a shouldered portion 119 received in a slightly elongated slot or opening 120 in the element 114 and serving to allow a limited pivoting action of the members 114 and 115 with respect to each other as is clear from the positions shown in Figs. 8, 9, and 10. The angle members 114 and 115 are cut away centrally at the corners as indicated at 121 and 122. Within the space thus made available is received a spring 124 which has its ends anchored in openings 125 and 126 in the elements 114 and 115 respectively. The element 115 is bifurcated at the end which contacts the projection 116 and has stop elements 127 received within the two spaced branches of the projection 116 to prevent displacement and knife edged portions 128 forming a bearing against the projection 116. A spring 129 secured to the element 115 by fastening through the opening 126 is connected at its other end to a suitable pin 130 mounted between opposed portions of the framework 101. The element 115 is provided in that portion which lies alongside an angle portion of the element 114 with a slot 131 which receives loosely a pivoted element 132 forming a part of the actuator. The actuator consists of the pivoted element 132, the U-shaped actuating element 92 pivoted at 133 to the portion 101 and having its ends provided with notches 134 which receive knife edged portions of the element 132 together with a spring 135 passing through an opening 136 in the pivoted element 132 and hooked over a rod 91 carried by the element 92. The element 92 is actuated by the insulation block 88 through the medium of the rod 91 as hereinbefore described.

The switch mechanism indicated in Fig. 1 by the numerals 37, 55 and 56 is quite similar in construction to that already described in connection with the manual switch 39, 40, and 41, comprising an element 137 of a construction identical with that 107, the element 99 similar to that 103, although actuated in a different manner, as will be described, and a spring 138 connected between the elements 99 and 137 in a manner exactly similar to the relation of spring 108 to members 107 and 103. The element 37 bridges between contacts 55 and 56 as will be best seen by reference to the left hand half of Fig. 6. The element 99, as already brought out, is actuated by the element 96 engaging against the element 98 (see Fig. 5). The element 99 carries a projection 139 to which is connected a spring 140 secured by an adjustable stud 140ª to the insulating frame portion 101, as clearly indicated in Fig. 5, for the purpose of biasing the said element 99 in a direction opposite to that in which the element 96 operates to actuate the same. Thus the switch element 99 is moved in one direction by expansion of the bellows 33 and in the other direction by the biasing spring 140, tension of said biasing spring determining the conditions of operation for member 99.

The switch mechanism indicated in Fig. 1 by the numerals 36, 44, and 45 may be considered as comprising fixed contacts 44 and 45, a composite movable contact made up of angle members 141 and 142 and an actuator comprising a pivoted element 143, the element 95 and a spring 144. By reference to Fig. 6 it will be seen that the contacts 45 and 55 are made up of an integral piece of sheet metal instead of being separate and connected by conductors 46 and 54 as indicated in Fig. 1. The elements 141 and 142, the springs 145 and 146 and the mounting 147 for the element 142 are identical with the corresponding parts 114, 115, 129, 124, and 116, respectively, already described, with the exception that the element 114 has its left hand end bent backwardly and provided with opposed contacts whereas the element 141 has contacts on but a single face presented toward the contacts 44 and 45. A suitable stop 148 which may be adjustable is provided for limiting motion of the element 141 in a direction away from the contact elements 44 and 45. In this respect the element 141 is similar to the elements 107 and 137 which are limited by stops 149 composed of insulating material rather than by opposed contacts as is the case with element 114. The stop 148 may be composed of metal or insulating material as desired as may also the stops 149 inasmuch as they are set into insulating material. The composite switch mechanism indicated generailly by the numeral 36 is actuated by the pivoted element 143 which is pivoted in the notched end of the U-shaped element 95 and connected thereto by a spring 144 in the same manner as in the case of the composite switch element 34. The element 95 is actuated by the block 89 operating through the rod 94 as already described. It should be noted that in the case of switches 34 and 36 (see Fig. 12) the angle members are able to pivot with respect to each other in a direction parallel to the axis of the pivot mounting of the members 115 and 142 and that they are able to pivot about the element 119 about an axis which is always at right angles to such pivot mounting whereby the contact pressure on the contacts bridged by such elements is equalized. Rotation about the element 119 is in both cases limited by stops 150 which are carried by the elements 115 and 142 and which engage against the ends of elements 114 and 141. It should be noted that the slot 131 is considerably wider than the thickness of the elements 132 and 143 whereby to allow such elements in passing from one side to the other of such slot to gain a sufficient momentum to produce a hammer break. The sheet metal out of which the contact making elements are constructed consists preferably of a layer of silver over a base of monel metal and the movable switch elements having the contacts shown in the drawings as part spherical elevations may be produced by simply punching or otherwise deforming sheet metal of this kind to produce the elevated or extruded shape.

Operation of switch mechanisms

The operation of the switch mechanisms can best be understood by reference to Figs. 8, 9, and 10 which show to an enlarged scale the manual switch 39 in one position and the switch 34 in three positions. It will be understood that the drawings in these figures could equally well refer to switches 37 and 36 instead of those 39 and 34, the construction being substantially identical.

While it is thought that the operation of the switch 39 would be obvious without description, it may be pointed out that the pivot point 104 is intermediate the notch 109 and the rod 106 while the element 107 may be regarded as being pivoted upon the end of the element 103. The result is that the element 107 may be considered as an overcentering movable switch mechanism while the element 103 may be considered as a means for moving the pivot mounting of the element 107 toward the axis of the spring 108 and simultaneously moving the axis of the spring 108 toward the pivot mounting of the element 107. It thus becomes possible to manipulate this switch by a motion of the actuator no more than half as great as would be the case if the spring 108 were secured for example to the pivot 104. A further feature of this mounting is the fact that the tension of the spring 108 does not exert any direct pressure on the pivot point 104 but exerts its force in urging the elements 107 and 103 toward each other. There is a slight reaction pressure from the spring 108 transmitted to the pivot point 104 when the device is operated and when it is at rest off dead center but such force is very slight. It will be understood that in order to render this construction operative it is necessary to constrain the motion of the parts to such extent that the angle formed between the lines joining the two ends of the spring to the pivot point 109 is always an obtuse angle. For the purpose of this specification it is considered that a straight angle is an obtuse angle. It may be noted also that this construction results in a wiping action of the contact carried by the element 107 against the contact 40 when the element 103 is moved.

The operation of the switch 34 may be best understood by considering the positions of the parts as they move from the position in Fig. 10 through the intermediate position shown in Fig. 9 to the position shown in Fig. 8. The observations made in connection with switch 39 may for the most part be considered as applying to that portion of the switch 34 which is made up of the elements 92, 132 and 135, these elements being similar to those 103, 107 and 108 respectively but serving to actuate a more complex switch mechanism instead of merely carrying a contact as in the case of the switch 39. When the elements are in the position shown in Fig. 10, the spring 135 is tending to rotate the element 132 about its pivot mounting 134, it being understood that the element 92 is constrained against counterclockwise rotation, and serves to urge the element 115 to rotate in a clockwise direction. The spring 129 enhances this tendency and cooperates with the spring 135 to urge such clockwise rotation. The element 114 resists the tendency of the element 115 to rotate in a clockwise direction and consequently is itself rotated in a counterclockwise direction with respect to the element 115 as far as is permitted by the relation of its downwardly extending angle to the lost motion connection element 117. The spring 124 is stretched and exerting a considerable pull tending to rotate the element 114 in a clockwise direction with respect to the element 115. The spaced contact elements 151 and 152 carried by the element 114 are at the same time engaging against the contacts 51 and 50 and by reason of the possibility of pivoting action of the element 114 about the point 119 the contact pressure of these two points is equalized. The two points of anchorage of the spring 129 may be so related to the pivot point 109 and the throw of the element 15 as to overcenter and exert a contact closing pressure in both extreme positions but such relation is not necessary and these points may be so related that the spring 129 always exerts some pressure tending to move the element 115 in a clockwise direction. By reason of the fact that the spring 129 is exterting a contact closing action when the relation of parts is as shown in Fig. 10 the contact pressure will not be reduced to zero when the parts are moved to the position seen in Fig. 9 wherein the spring 135 is on dead center and that spring is exerting no contact closing pressure.

When the element 92 has been moved to the position shown in Fig. 9 the spring 129 will still be exerting a contact closing pressure but such pressure will not be sufficient to oppose the action of the spring 124 which has a direct pull whereas the spring 129 has but a slight component tending to stretch the spring 124. The result is that at some point between positions of Fig. 10 and Fig. 9 the combined pull of the springs 135 and 129 will be no longer sufficient to stretch the spring 124 and the parts 115 and 114 will move from the position of Fig. 10 to that of Fig. 9 thus producing a wiping action of the contacts 151 and 152 against the contacts 51 and 50. From the position of Fig. 9 the parts will move to the position of Fig. 8, the first action beyond the position of Fig. 9 being the movement of the element 132 within the slot 131 to the other side thereof. This motion occurs as soon as the parts pass dead center and the spring 129 is free to cause the lever 132 to overcenter with respect to its pivot mounting 109. Although the slot 131 is short, its width is sufficient to allow the element 132 to gain some momentum whereby to produce a hammer break when it reaches the other side of the slot 131 and its momentum is transmitted to the parts 114 and 115. The lost motion tending to produce the hammer break is augmented by the loose connection of the elements 114 and 115 and this may be sufficient to give the desired degree of hammer break even without the necessity of lost motion in the slot 131. After the lost motion has been taken up in the slot 131 and in the connection at 119, 120 the parts move without change other than a change of degree to the position shown in Fig. 1. It will also be noted that the cushioning effect of spring 124 in passing from Fig. 8 to 10 is peculiarly effective in preventing bouncing of contacts and incident arcing.

Having in mind the construction of the various switches, it will now become apparent that the relation of the switches 37 and 36 and the actuating means therefor is a peculiarly effective one. It will be seen that when the actuating arm 70 and consequently the element 96 has been moved a considerable distance toward the left by expansion of the bellows 33 due to elevation of the temperature in the storage compartment, the switch 37 will be actuated to contact switch points 55 and 56 and that a slight fluctuation of the temperature in the storage compartment at the limited region in which the switch 37 is actuated will result in a small back and forth motion of the element 96 which will result in opening and closing the switch 37. When the temperature in the storage compartment has been reduced below the range in which the switch 37 is actuated, the element 96 will have been moved to the right until it reaches a region, also limited, in which the switch 36 is operated to open and close the same by a small back and forth motion of the element 96, due to similar motion of the arm 70. It will thus be seen that the switch 37 is actuated to open and closed position by a small back and forth motion of the arm 70 in one limited region of its motion and that the switch 36 is opened and closed by a small back and forth motion of the arm 70 in another limited region of its motion. By reason of the small motions necessary to actuate the switches to open and close the same, it is quite practical with the motion of the arm 70 which can be obtained in a thermally responsive device of this kind to secure the necessary travel for operation of the parts as indicated to secure the results set forth above in the statement of the objects of the invention.

While I have shown and described the preferred embodiment of my invention I wish it understood that I am not limited to the details shown and described but only in accordance with the appended claims and the prior art.

Having thus described my invention, what I claim is:

1. In an automatic control, an element movable responsive to conditions to be controlled, a plurality of switch mechanisms, and means operated by said element for actuating one of said switch mechanisms to open and close the same by back and forth motion of said element in a limited region of its motion responsive to said conditions and for actuating the other of said switch mechanisms to open and close the same by back and forth motion of said element in another limited region of its motion responsive to said conditions, said switch mechanisms including overcentering levers actuated by spring means connected thereto, and movable elements upon which said overcentering levers are pivotally mounted and to which said spring means are connected, said movable elements being pivotally supported intermediate the connection of the springs and the pivot points of said levers, whereby small motion of said movable elements will serve to operate said switches.

2. In an automatic control, an element movable responsive to conditions to be controlled, a plurality of switch mechanisms, and means operated by said element for actuating one of said switch mechanisms to open and close the same by a back and forth motion of said element in a limited region of its motion responsive to said conditions and for actuating the other of said switch mechanisms to open and close the same by back and forth motion of said element in another limited region of its motion responsive to said condition, said switch mechanisms including overcentering levers actuated by spring means connected thereto, and movable elements upon which said overcentering levers are pivotally mounted and to which said spring means are connected, and adjustable spring means biasing said element for determining the opening and closing conditions of said switch mechanisms.

3. In an automatic control, an element movable responsive to conditions to be controlled, a plurality of switch mechanisms, and means operated by said element for actuating one of said switch mechanisms to open and close the same by a back and forth motion of said element in a limited region of its motion responsive to said conditions and for actuating the other of said switch mechanisms to open and close the same by back and forth motion of said element in another limited region of its motion responsive to said condition, said switch mechanisms including overcentering levers actuated by spring means connected thereto, and movable elements upon which overcentering levers are pivotally mounted and to which said spring means are connected, adjustable spring means biasing said element for determining the opening and closing conditions of said switch mechanisms, and additional spring means associated with one of said switches and operating to affect the bias created by said first spring means in that region in which such switch is actuated by said element.

4. In an automatic control, an element movable responsive to conditions to be controlled, a plurality of switch mechanisms, and means operated by said element for actuating one of said switch mechanisms to open and close the same by a back and forth motion of said element in a limited region of its motion responsive to said conditions and for actuating the other of said switch mechanisms to open and close the same by back and forth motion of said element in another limited region of its motion responsive to said condition, said switch mechanisms including overcentering levers actuated by spring means connected thereto, and movable elements upon which said overcentering levers are pivotally mounted and to which said spring means are connected, adjustable spring means biasing said element for determining the opening and closing conditions of said switch mechanisms, and additional, adjustable spring means associated with one of said switches and operating to affect the bias created by said first spring means in that region in which such switch is actuated by said element.

5. In a switch, supporting means, spaced fixed contact elements carried thereby, a movable contact element pivoted to said support and engageable against said fixed contact elements, and comprising a pair of angle members having parts extending alongside each other and connected together by a lost motion pivot connection allowing pivoting about axes substantially parallel and perpendicular respectively to the pivot axis of said movable contact element, and spring means tending to hold said angle members in a predetermined relative position.

6. In a switch, supporting means, spaced fixed contact elements carried thereby, a movable contact element pivoted to said support and engageable against said fixed contact elements, and comprising a pair of angle members having parts extending alongside each other and connected together by a lost motion pivot connection allowing pivoting about axes substantially parallel and perpendicular respectively to the pivot axis of said movable contact element, means for limiting pivoting about the axis perpendicular to said pivot axis, and spring means tending to hold said angle members in a predetermined relative position.

7. In a switch construction, a support, a fixed contact element, a movable contact element, said movable contact element being pivoted to said support, spring means serving to hold said movable contact element in fixed-contact-engaging position and an actuator for said movable contact element, said actuator comprising a pivotally mounted member, a second member pivoted thereto and extending alongside said movable contact element, spring means tending to reduce the angle between said members and means for limiting the relative motion of said members whereby to maintain an obtuse angle therebetween at all times.

8. In a switch mechanism, fixed and movable contacts, said movable contact being made in two parts, connected together for limited relative motion, one of said parts being pivotally mounted, spring means urging said pivotally mounted part in one direction, spring means for urging said parts toward a predetermined relative position opposite that produced by urging the same against said fixed contact, and an actuator for moving said movable contact to and from fixed contact engaging position, said actuator comprising a pivotally mounted member, a second member pivoted thereto and spring means tending to reduce the angle between said members and means for limiting the relative motion of said members whereby to maintain an obtuse angle therebetween at all times, said actuator extending alongside said movable contact, and laterally extending means connecting said movable contact and said actuator.

9. In a switch, supporting means, a fixed contact element carried thereby, a movable contact element comprising a pair of angle members, one being pivoted to the support, the other being engageable against said fixed contact element, said members having parts extending alongside each other and connected together by a lost motion connection at points intermediate the ends of said parts, and spring means tending to hold said angle members in a predetermined relative position.

10. In a switch, fixed and movable contacts, a lever carrying said movable contact, a spring connected in overcentering relation to said lever, and means for actuating said lever, said means comprising a movable pivot mounting, a second lever pivoted in said movable pivot mounting and interconnected by a lost motion connection with said first lever, a second spring connected in overcentering relation to said second lever and means for moving said pivot mounting toward the axis of said spring.

11. In a switch, in combination, a support including a pair of spaced stops, at least one of said stops being a switch contact, a movable elongated element pivoted on said support, a switch element pivoted to said first element at one side of the pivot point of said first element, a spring pivoted to said first element at the other side of said pivot point and pivoted to said switch element at a point spaced from the point of pivotal connection between said first element and said switch element and means including said stops for maintaining said elements and said spring in general alignment while permitting limited pivotal motion of said first element and motion of said switch element back and forth between said stops, and means engaging said first element at a point on the side of its pivot connection to said support opposite the pivot point of said switch element, for operating the latter between open and closed position.

12. In a switch, in combination, a support including a pair of spaced stops, at least one of said stops being a switch contact, a movable elongated element pivoted on said support, a switch element pivoted to said first element at one side of the pivot point of said first element, a spring pivoted to said first element at the other side of its pivot point and pivoted to said switch element at a point spaced from the point of pivotal connection between said first element and said switch element and means including said stops for maintaining said elements and said spring in general alignment while permitting limited pivotal motion of said first element and motion of said switch element back and forth between said stops, the length of said switch element being small as compared to that of said first element.

13. In a switch, in combination, a support including a pair of spaced stops, at least one of said stops being a switch contact, a movable elongated element pivoted on said support, a switch element pivoted to said first element at one side of the pivot point of said first element, a spring pivoted to said first element at the other side of its pivot point and pivoted to said switch element at a point spaced from the point of pivotal connection between said first element and said switch element and means including said stops for maintaining said elements and said spring in general alignment while permitting limited pivotal motion of said first element and motion of said switch element back and forth between said stops.

14. In a switch, in combination, a support including a pair of spaced stops, at least one of said stops being a switch contact, a switch element pivoted on said support, a movable, elongated element also pivoted on said support, a switch actuating element connected to said switch element and pivoted to said elongated element at one side of the pivot point of said elongated element, a spring pivoted to said elongated element at the other side of its pivot point and pivoted to said switch actuating element at a point spaced from the point of pivotal connection between said elongated element and said switch actuating element and means including said stops for maintaining said elements and said spring in general alignment while permitting limited pivotal motion of said switch element and switch actuating element back and forth between predetermined operating limits.

JOHN J. BAUMAN.